United States Patent
Freychet et al.

(10) Patent No.: US 11,791,661 B2
(45) Date of Patent: Oct. 17, 2023

(54) METHOD FOR OPERATING AN ACOUSTIC TRANSMISSION SYSTEM SO AS TO OPTIMIZE TRANSMITTED POWER

(71) Applicant: COMMISSARIAT A L'ENERGIE ATOMIQUE ET AUX ENERGIES ALTERNATIVES, Paris (FR)

(72) Inventors: Olivier Freychet, Grenoble (FR); Sébastien Boisseau, Grenoble (FR); François Frassati, Grenoble (FR); Ghislain Despesse, Grenoble (FR)

(73) Assignee: COMMISSARIAT ÁL'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 35 days.

(21) Appl. No.: 17/702,911

(22) Filed: Mar. 24, 2022

(65) Prior Publication Data
US 2022/0311279 A1 Sep. 29, 2022

(30) Foreign Application Priority Data
Mar. 24, 2021 (FR) ...................... 2102961

(51) Int. Cl.
*H02J 50/15* (2016.01)
(52) U.S. Cl.
CPC .................... *H02J 50/15* (2016.02)
(58) Field of Classification Search
None
See application file for complete search history.

(56) References Cited

U.S. PATENT DOCUMENTS

| | | | |
|---|---|---|---|
| 2008/0258841 A1 | 10/2008 | Sherrit et al. | |
| 2010/0027379 A1 | 2/2010 | Saulnier et al. | |
| 2014/0016558 A1 | 1/2014 | Lawry et al. | |
| 2014/0028110 A1* | 1/2014 | Petersen | H02J 50/30 307/104 |
| 2015/0003207 A1* | 1/2015 | Lee | H02J 50/15 367/118 |
| 2015/0049587 A1 | 2/2015 | Lawry et al. | |
| 2017/0271926 A1* | 9/2017 | Plekhanov | H01Q 21/061 |
| 2019/0137646 A1* | 5/2019 | Frey | G01V 3/12 |
| 2020/0204271 A1 | 6/2020 | Frassati et al. | |

FOREIGN PATENT DOCUMENTS

WO 2012/141891 A1 10/2012

OTHER PUBLICATIONS

Freychet, O. et al. "A Versatii F Through-Metal-Wall Acoustic Power and Data Transfer Solution," 2019 19th International Conference on Micro and Nanotechnology for Power Generation and Energy Conversion Applications (PowerMEMS), IEEE, pp. 1-6, Dec. 2, 2019.
Lawry, T. et al. "Electrical Optimization of Power Delivery Through Thick Steel Barriers Using Piezoelectric Transducers," Proceedings of Spie, vol. 7683, pp. 768314, Apr. 21, 2010.
Freychet, O. et al. "Analytical Optimization of Piezoelectric Acoustic Power Transfer Systems," Engineering Research Express, vol. 2, No. 4, Nov. 27, 2020.

* cited by examiner

*Primary Examiner* — Jared Fureman
*Assistant Examiner* — Joel Barnett
(74) *Attorney, Agent, or Firm* — Oliff PLC (57) ABSTRACT

The invention essentially consists of a system (1) for transmitting acoustic power, which will determine the optimum frequency and the optimum electrical load without data communication being established beforehand with the receiver (3).

14 Claims, 5 Drawing Sheets

METHOD FOR OPERATING AN ACOUSTIC TRANSMISSION SYSTEM SO AS TO OPTIMIZE TRANSMITTED POWER

TECHNICAL FIELD

The present invention relates to the general field of transmission systems using acoustic waves.

In an acoustic transmission system, information and/or energy are/is transmitted acoustically between an emitter and a receiver. The information and/or the energy are/is thus transmitted wirelessly and contactlessly.

PRIOR ART

In some applications, it is necessary to communicate with sensors placed on either side of one or more metal walls.

It is not possible to use electromagnetic techniques (RFID, Wi-Fi, Bluetooth) since electromagnetic waves are absorbed by a metal wall.

One solution that may be used in some applications consists in piercing a hole in the wall in order to pass wires through it. This solution requires maintenance and may weaken the structure.

One alternative currently being looked into in various laboratories consists in implementing transmission systems using acoustic waves, since these propagate well through metal.

In particular, they are implemented in order to transmit power when it is desired to supply electric power to one or more receivers, in particular physically isolated sensors and their communication system, such as for example in tanks or high-pressure pipelines.

Figure 1:
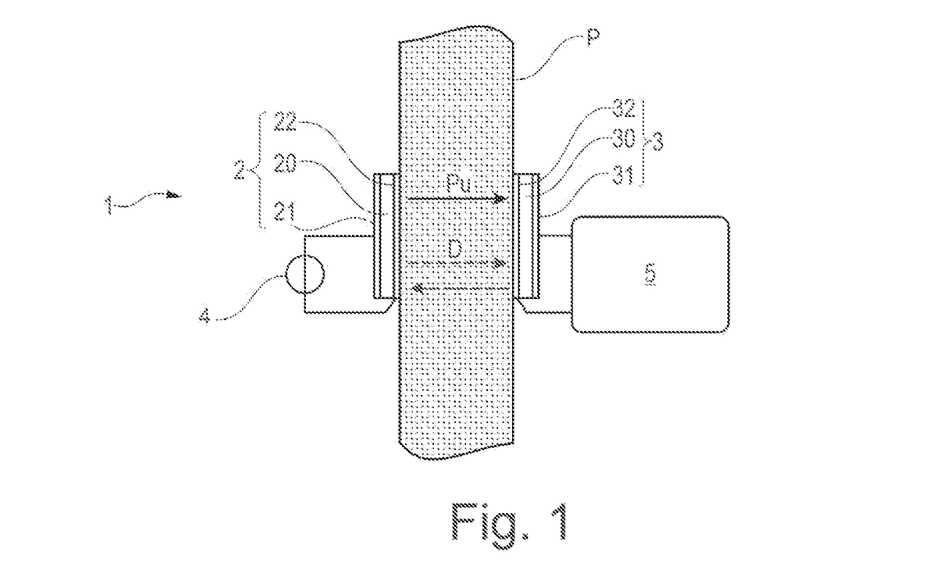
FIG. 1 is a schematic depiction showing one example of an acoustic transmission system for acoustic transmission through a metal wall according to the invention.

FIG. 1 schematically shows such an acoustic transmission system for transmitting power.

This system 1 comprises an acoustic emitter 2 and an acoustic receiver 3 that are in contact on either side of a metal wall P.

The acoustic emitter 2 consists of a piezoelectric disk 20 inserted between two electrodes 21, 22.

The acoustic receiver 3 also consists of a piezoelectric disk 30 inserted between two electrodes 31, 32.

An electric power source 4 is connected to the two electrodes 21, 22 of the emitter 2.

On the other side of the wall P, the two electrodes 31, 32 of the receiver are connected to an electronic unit 5 designed to manage electric power and that comprises a node of sensors.

The operation of such a system 1 is as follows:

The electric power from the source 4 is transmitted by applying a sinusoidal voltage to the electrodes 21, 22, which set the piezoelectric disk 20 in mechanical vibration. The mechanical deformations resulting from this voltage propagate into the thickness of the metal wall P and are transmitted to the piezoelectric disk 30 of the receiver 3, and are therefore converted into electricity.

And the electronic unit 5 is able to manage the electric power that is received.

With such a system 1, it is possible to transfer power (solid arrow Pu in FIG. 1) from the emitter 2 to the receiver 3, but also to convey data in both directions (dashed arrows D in FIG. 1).

Figure 2:
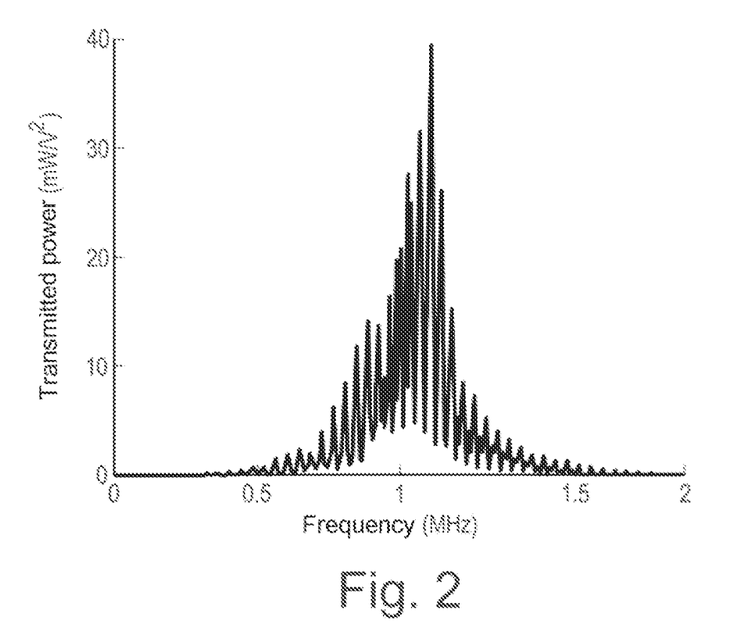
FIG. 2 illustrates the normalized acoustic power spectrum as a function of frequency, obtained through a metal wall according to the prior art.

One of the drawbacks of acoustic power transmission through metal walls is its high frequency selectivity: this is illustrated in FIG. 2 for a normalized power transmitted through a 60 mm-thick steel wall.

It therefore proves necessary to supply power to the acoustic emitter at a favorable frequency in order to achieve good operation.

Moreover, even if preliminary characterization is performed when installing the system, this characterization will not be reliable over time, since the preferred frequencies are highly temperature-dependent.

Furthermore, the preliminary characterization is not necessarily possible depending on configurations.

In general, the inventors observed that, in order to maximize transmitted acoustic power, it was expedient to determine both the optimum frequency and the electrical load to be connected to the acoustic receiver.

Various solutions for choosing the optimum frequency of power transmission have already been proposed.

Patent application US2020/0204271 to this end proposes to choose the frequency at which input admittance is at a minimum. This does not guarantee achieving maximum efficiency or transmitted power, nor does it make it possible to determine the electrical load to be connected.

US2015/0049587 proposes to choose the frequency that makes it possible to have the highest voltage across the storage capacitor connected to the receiver. This requires having established communication beforehand so that the receiver is able to send the level of charge of the capacitor. This solution also does not make it possible to determine the electrical load to be connected.

US2014/0016558 characterizes the acoustic system prior to any transmission. The optimum electrical load to be connected to the receiver is thus initially determined with a vector network analyzer. This involves having physical access to both sides of the metal wall, this not systematically being able to be achieved depending on the applications. Furthermore, this determination that is initially performed is no longer necessarily applicable during operation and if conditions change, for example in the event of a temperature change. Moreover, during operation, the frequency is chosen by communicating the power received by the receiver to the emitter. However, this involves having established communication beforehand so that the receiver is able to communicate data.

US2010/0027379 describes an operating mode in which the determined frequency is determined by the greatest amplitude of the received signal. This requires having established communication beforehand so that the receiver is able to send the amplitude of the received signal. There is no determination of any electrical load to be connected.

To sum up, the existing solutions described above do not make it possible to choose the optimum frequency in order to maximize power transmission without data communication being established beforehand with the receiver, nor do they make it possible to choose the electrical load to be connected to the receiver, before and during operation, also in order to maximize power transmission.

There is therefore a need to improve the solutions for operating an acoustic transmission system so as to overcome the abovementioned drawbacks in order to maximize transmitted acoustic power.

One aim of the invention is to at least partially address this need.

DESCRIPTION OF THE INVENTION

To this end, a first subject of the invention is a method for operating an acoustic transmission system, comprising the following steps:

i/ installing the system with at least one emitter and at least one acoustic receiver on a support, the system being an electric quadrupole whose impedance matrix, linking the emitter voltage ($U_1$) and the receiver voltage ($U_2$) to the emitter current ($I_1$) and the receiver current ($I_2$), is written using the equation:

$$\begin{pmatrix} U_1 \\ U_2 \end{pmatrix} = \begin{pmatrix} Z_{11}(f) & Z_{12}(f) \\ Z_{21}(f) & Z_{22}(f) \end{pmatrix} \begin{pmatrix} I_1 \\ I_2 \end{pmatrix} \qquad \text{[Equation 1]}$$

the quadrupole being reciprocal, with $Z_{12}$ being equal to $Z_{21}$;

ii/ performing frequency scanning three times in a row, each time with an electrical load connected to the receiver $Z_{load}$ distinct from the previous one, so as to determine the values of $Z_{11}$, $Z_{12}$ and $Z_{22}$ for each frequency;

iii/ based on the determination of the values of $Z_{11}$, $Z_{12}$ and $Z_{22}$, determining a characteristic frequency ($f_{opt}$) so as to maximize the transmitted power, the receiver voltage ($U_2$) or the efficiency of the system.

According to one advantageous embodiment, step iii/ comprises the following sub-steps:

iii1/ determining the characteristic frequency (fopt) based on the determination of the maximum power achievable at each frequency (f) using the relationship $$\overline{P}(f) = \frac{1}{2} R \left( Z_{22} - \frac{Z_{12}^2}{Z_{11}} \right) \left| \frac{Z_{12}}{2Z_{11}Z_{22} - 2Z_{12}^2} \right|^2 \qquad \text{[Equation 9]}$$

iii2/ applying two electrical loads connected to the receiver Zload that are distinct from one another, when a sinusoidal signal is emitted by the emitter, so as to determine the optimum electrical load based on Thévenin's theorem and the relationship $Z_{load} = Z_{out}^*$, determining the characteristic frequency and the optimum electrical load for maximizing the transmitted power.

According to one advantageous embodiment, the acoustic system may comprise multiple emitters and multiple acoustic receivers. In such an embodiment, each receiver is dimensioned so as to be supplied with power within a frequency range different from the other receivers. For example, it is possible to adjust the dimensions of the receiver so as to resonate at a frequency within a predetermined frequency range.

The method may then be executed in each of the respective frequency ranges in order to determine the characteristic frequency (fopt) that maximizes the transmitted power, the receiver voltage or the efficiency for each of the receivers.

According to one configuration, the support is a wall, in particular a metal wall, the emitter and the receiver being arranged on the same side or on either side of the wall. The method according to the invention may be implemented for an acoustic transmission system for acoustic transmission through a support made of any material that typically has a characteristic acoustic impedance of between 1 and 100 MRayl.

Advantageously, the distinct electrical loads connected to the receiver in step ii/ are respectively an infinite load, corresponding to an open electrical circuit at the receiver, a load of known value, and a zero load, corresponding to a short circuit at the receiver.

According to a first variant, the duration between each frequency scan is defined by the receiver, which waits for a predefined duration that is known to the emitter.

According to a second variant, the duration between each frequency scan is defined by the receiver, which indicates to the emitter that it is ready by alternating the connected load, and then changes the connected electrical load.

According to a third variant, the duration between each frequency scan is defined by a change in impedance at the emitter without active components at the receiver.

According to one advantageous embodiment, step iii/ comprises the following sub-steps:

iii1/ determining the characteristic frequency (fopt) based on the determination of the maximum power achievable at each frequency (f) using the relationship $$\overline{P}(f) = \frac{1}{2} R \left( Z_{22} - \frac{Z_{12}^2}{Z_{11}} \right) \left| \frac{Z_{12}}{2Z_{11}Z_{22} - 2Z_{12}^2} \right|^2 \qquad \text{[Equation 9]}$$

iii2/ applying two electrical loads connected to the receiver Zload that are distinct from one another, when a sinusoidal signal is emitted by the emitter, so as to determine the optimum electrical load based on Thevenin's theorem and the relationship $Z_{load} = Z_{out}^*$, determining the characteristic frequency and the optimum electrical load for maximizing the transmitted power.

Step iii2/ comprises one or the other of the following steps:
- keeping the voltage U1 at the emitter at a constant frequency;
- applying one of the two distinct electrical loads without the emitter disconnecting the signal;
- measuring the amplitude of the signal of the voltage U2 or of the current I2 at the receiver during the connection of the first electrical load;
- before disconnecting the first electrical load, repeating a phase element as though the sinusoidal signal U2 or I2 were continued;
- applying the second electrical load;
- measuring the amplitude of U2 or I2 and the phase with the continued signal before disconnecting the first load.

The invention thus essentially consists of a system for transmitting acoustic power, which will determine the optimum frequency and the optimum electrical load without data communication being established beforehand with the receiver.

Once the optimum frequency and the optimum electrical load have been determined, power is transmitted correctly, and it is possible to establish communication.

In order to maintain the optimum power, it is necessary to regularly adjust the frequency and electrical load values.

This adjustment may be performed either by reiterating the method described above or through the communication that is then established between the emitter and the receiver, making it possible to send data describing the quality of the power transmission.

The invention has many advantages, including a significant increase in the robustness of acoustic power transmission systems.

The invention also relates to the application of the method that has just been described in order to send electric power through a metal wall, in particular a metal wall of a vessel, a submarine, a tank, a container or a pipe.

Other advantages and features will emerge more clearly on reading the detailed description, which is given by way of non-limiting illustration, with reference to the following figures.

DETAILED DESCRIPTION

FIGS. 1 and 2 have already been commented upon in the preamble. They will therefore not be described below.

A description is given below of a method for operating an acoustic transmission system according to the invention so as to maximize transmitted acoustic power.

Step i/: An acoustic transmission system 1 as shown in FIG. 1 is installed.

Figure 3:
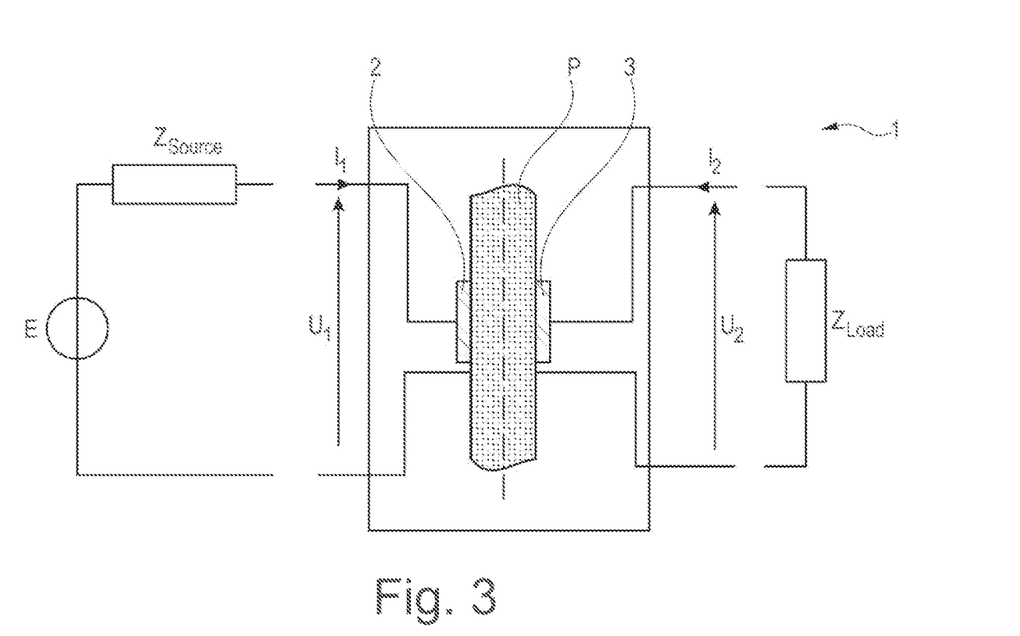
FIG. 3 is a depiction, in the form of an electric quadrupole, of an acoustic transmission system for acoustic transmission through a metal wall.

This system 1 may be characterized as being an electric quadrupole shown schematically in FIG. 3.

This system is also linear, even for large excitation amplitudes: see publication 1.

It may therefore be described correctly by its impedance matrix, the emitter voltage (U1) and the receiver voltage (U2) at the emitter current (I1) and the receiver current (I2), using the equation:

$$\begin{pmatrix} U_1 \\ U_2 \end{pmatrix} = \begin{pmatrix} Z_{11}(f) & Z_{12}(f) \\ Z_{21}(f) & Z_{22}(f) \end{pmatrix} \begin{pmatrix} I_1 \\ I_2 \end{pmatrix}.$$ [Equation 1]

Thus, for each frequency, knowing $Z_{11}$, $Z_{12}$, $Z_{21}$ and $Z_{22}$ makes it possible to determine the behavior of the system.

It is then possible to determine the power transmitted for each frequency, thus making it possible to choose the optimum frequency for maximum power: see publication 2.

The system is a reciprocal quadrupole, hence: $Z_{12}=Z_{21}$.

In the most restrictive configuration, it is possible to access only the emitter 2, that is to say the input of the reciprocal quadrupole.

It is therefore possible only to measure the input impedance.

The inventors therefore conceived of performing three different measurements in order to be able to determine the values of $Z_{11}$, $Z_{12}$ and $Z_{22}$.

The input impedance Zin of a quadrupole is given by:

$$Zin = Z_{11} - \frac{Z_{12}^2}{Z_{22} + Z_{Load}}$$ [Equation 2]

in which $Z_{load}$ is the impedance of the load connected to the receiver 3 (FIG. 3).

When the electrical impedance connected to the receiver is changed, the input impedance of the quadrupole also changes.

Step ii and iii1/:

Changing the load impedance connected to the receiver three times makes it possible to determine $Z_{11}$, $Z_{12}$ and $Z_{22}$.

This method works for three different connected impedances Z.

For example, the three different impedances may be:
when an open circuit is applied, then $Z_{Load}=+\infty$,
when an impedance of known value is applied, then $Z_{Load}=Z$
when a closed circuit is applied, then $Z_{Load}=0$.

Thus, in order to measure the input impedance with an open circuit on the output ($Z_{in}^{CO}$), the connected impedance is $Z=+\infty$, hence $Z_{11}=Z_{in}^{CO}$ In order to measure the input impedance with a known load on the output ($Z_{in}^{Z_{Load}}$), the connected impedance is $Z=Z_{Load}$, hence $$Z_{in}^{Z_{Load}} = Z_{11} - \frac{Z_{12}^2}{Z_{22} + Z_{Load}}$$ [Equation 3]

And therefore, $$Z_{22} = Z_{Load}\left(\frac{Z_{in}^{CO} - Z_{in}^{Z_{Load}}}{Z_{in}^{Z_{Load}} - Z_{in}^{CC}}\right)$$ [Equation 4]

In order to measure the input impedance when the output is short-circuited ($Z_{in}^{CC}$), the connected impedance is $Z=0$ hence $$Z_{in}^{CC} = Z_{11} - \frac{Z_{12}^2}{Z_{22}}$$ [Equation 5]

And therefore, $$Z_{12} = \sqrt{(Z_{in}^{CO} - Z_{in}^{CC})Z_{22}}$$ [Equation 6]

With these three measurements, the values of $Z_{11}$, $Z_{12}$ and $Z_{22}$ are thus determined.

It is then possible to apply the formulas given in publication 2 in order to obtain the transmitted power normalized by the input voltage.

The normalized transmitted power is given by:

$$\overline{P}(f, Z_{Load}) = \frac{P_{out}}{|U_1|^2} = \frac{\text{Re}(Z_{Load})}{2}\left|\frac{Z_{12}}{Z_{in}(Z_{22} + Z_{Load})}\right|^2$$ [Equation 7]

where $$Z_{in} = Z_{11} - \frac{Z_{12}^2}{Z_{22} + Z_{Load}} \quad \text{[Equation 2]}$$

The normalized power is therefore maximized for each frequency f when:

$$Z_{Load}(f) = \left(\frac{Z_{22}Z_{11} - Z_{12}^2}{Z_{11}}\right)^*. \quad \text{[Equation 8]}$$

By substituting this expression into that for the power, the maximum power achievable at each frequency is:

$$\mathcal{P}(f) = \frac{1}{2}\mathfrak{R}\left(Z_{22} - \frac{Z_{12}^2}{Z_{11}}\right)\left|\frac{Z_{12}}{2Z_{11}Z_{22} - 2Z_{12}^2}\right|^2 \quad \text{[Equation 9]}$$

where $\mathfrak{R}$ is the real part of a complex number.

Therefore, by performing three frequency scans, by changing the electrical load connected to the receiver (different Z for each scan) for each scan, it is possible to determine the frequency that maximizes the output power.

Changing the load connected to the receiver requires only very little energy. It is therefore possible to determine the optimum frequency with very little energy stored on the receiver 3 side, while having access only to the emitter 2 side of the system.

Once the optimum frequency has been found, the emitter 2 is continuously supplied with power at this frequency.

The emitter may then trigger additional step iii2/, allowing it to determine the optimum electrical load applied to the receiver 3 in order to maximize the transmitted acoustic power.

Step iii2/:

The inventors believe that the connected impedance has a significant impact on the recovered power.

Indeed, considering a resistive load variation from 0 to infinity, there is recovery of electric power, that is to say that dissipated by the resistor. For these two extremes, the recovered power is zero (zero voltage or zero current).

There is therefore a maximum power to be recovered.

Finding this maximum power through iteration is a very lengthy process since it involves testing all possible electrical loads at the receiver, these also being resistive and reactive.

The inventors have therefore conceived of a method that makes it possible to dispense with this iteration.

Figure 4:
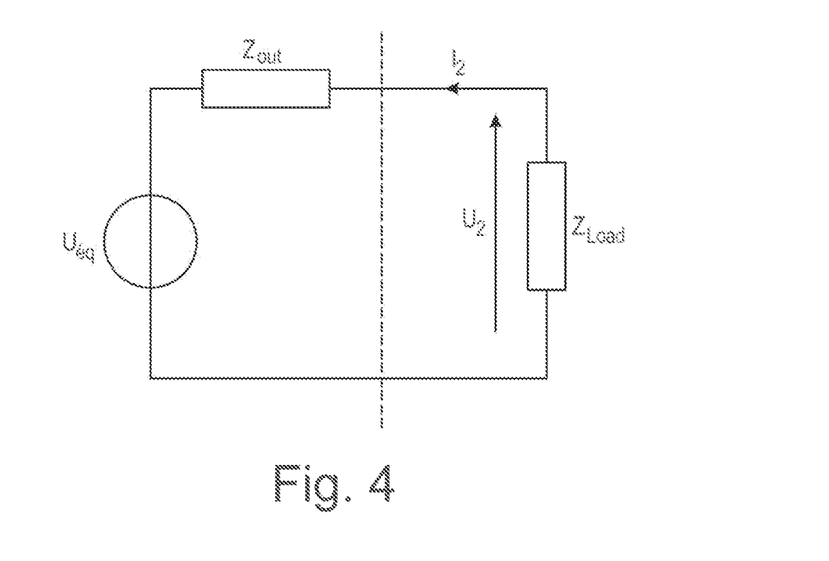
FIG. 4 shows the equivalent circuit diagram of the quadrupole according to FIG. 3 obtained by applying Thevenin's theorem.

Since the acoustic transmission system 1 is linear, then the inventors believe that Thévenin's theorem may be applied.

As a reminder, this theorem reads as follows: "A linear electrical network seen from two points is equivalent to a perfect voltage generator whose electromotive force is equal to the no-load potential difference between these two points, in series with an impedance equal to that measured between the two points when the independent generators are made passive".

The system 1 may thus be considered to be an equivalent circuit diagram obtained by applying Thévenin's theorem, as shown in FIG. 4.

By applying the maximum power theorem, the power on the load $Z_{out}$ is at a maximum when:

$$Z_{Load} = Z_{out}^*$$

where $Z_{out}^*$ is the complex conjugate of $Z_{out}$: see publication 3.

In the case of a purely resistive load, the power transmitted to the load is at a maximum when $Z_{Load} = |Z_{out}|$.

Knowing $Z_{out}$ thus makes it possible to determine the optimum electrical load for obtaining the maximum power.

It is therefore a question of determining $Z_{out}$. This complex (resistive and reactive) variable may be determined using two different methods:

either by short-circuiting the emitter and by measuring the output impedance;

or by performing two successive measurements on the (receiver) output when the emitter emits a sinusoidal signal.

The first method involves the receiver then having to emit a sinusoidal voltage, this requiring a relatively large amount of energy.

The inventors therefore preferred the second method since it required less energy.

According to this second method, considering [Equation 10]: $U_{éq} + Z_{out}I_2 = U_2$, there are two variables ($U_{éq}, Z_{out}$).

Two equations are therefore needed to determine them. These are obtained by connecting two impedances of different values to the receiver 3.

For example, these values may be when the loads are open-circuited and short-circuited.

When the receiver 3 is open-circuited, $I_2=0$, and then $U_{éq}=U_2^{CO}$.

By short-circuiting the receiver 3, $U_2=0$, thereby making it possible to determine $Z_{out}$ using:

$$Z_{out} = -\frac{U_2^{CO}}{I_2^{CC}}. \quad \text{[Equation 11]}$$

Hence:

$$\begin{cases} Z_{out} = \frac{\left(U_2^{Z_2}U_1^{Z_1} - U_2^{Z_1}U_1^{Z_2}\right)Z_1Z_2}{U_2^{Z_1Z_2}Z_2 - U_2^{Z_2}U_1^{Z_1}Z_1} \\ U_{eq} = U_2^{Z_1}\frac{Z_1 + Z_{out}}{U_1^{Z_1}Z_1} \end{cases} \quad \text{[Equation 12]}$$

The phase between $U_2^{CO}$ and $I_2^{CC}$ is large in order to determine the real and imaginary parts of $Z_{out}$. Indeed, the optimum impedance to be connected at output may have a reactive component, as already mentioned.

One difficulty is that the voltage $U_2^{CO}$ and the current $I_2^{CC}$ are measured in a time-offset manner and that also, on the receiver side, there is no access to the emitted signal $U_1$.

It is then not possible to directly measure a phase offset between $U_2^{CO}$ and $I_2^{CC}$, or between $U_2^{CO}$ and $U_1$, or between $I_2^{CC}$ and $U_1$.

To overcome this difficulty, the inventors have conceived of a multi-step solution.

The first step consists in keeping the voltage $U_1$ at the emitter 2 at a constant frequency throughout the duration of the two measurements, that is to say with the two different loads (open circuit and short circuit) without disconnecting the signal between the two measurements.

The second step consists in measuring the frequency and the phase of the signal, of the voltage $U_2$ or of the current $I_2$ at the receiver 3 during the connection of the first load. For example, by setting a counter to zero, when $U_2$ or $I_2$ crosses zero (with an increasing or decreasing value), and by storing the value of the counter at the next zero crossing of this current, in the same direction (increasing or decreasing) just before resetting the counter to zero.

The third step consists, just before disconnecting the first load, in continuing until obtaining the repetition of a phase element as though the signal were continuing. For example, in the example of the counter, the counter is no longer set to zero at the zero crossing of the voltage $U_2$ or of the current $I_2$, but when the counter reaches the value that had been measured/recorded beforehand at the end of a period.

Thus, when the second load value is connected, the phase of the current $I_2$ and/or of the voltage $U_2$ may be compared with this replicated/repeated phase element. For example, it is possible to measure the temporal or angular distance between the zero crossing of the signal $U_2$ and/or $I_2$ with the theoretical zero crossing (at the return of the counter to zero) of the signal $U_2$ or $I_2$ measured during the first load as though the single continued to exist.

"Just before" is understood to mean in practice compensation for the associated delay if necessary by resetting the counter to 1, or a few clock cycles, rather than zero for compensating for the delay induced in the setting to zero.

The impedance $Z_{out}$ may then be determined along with the optimum electrical load.

Figure 5:
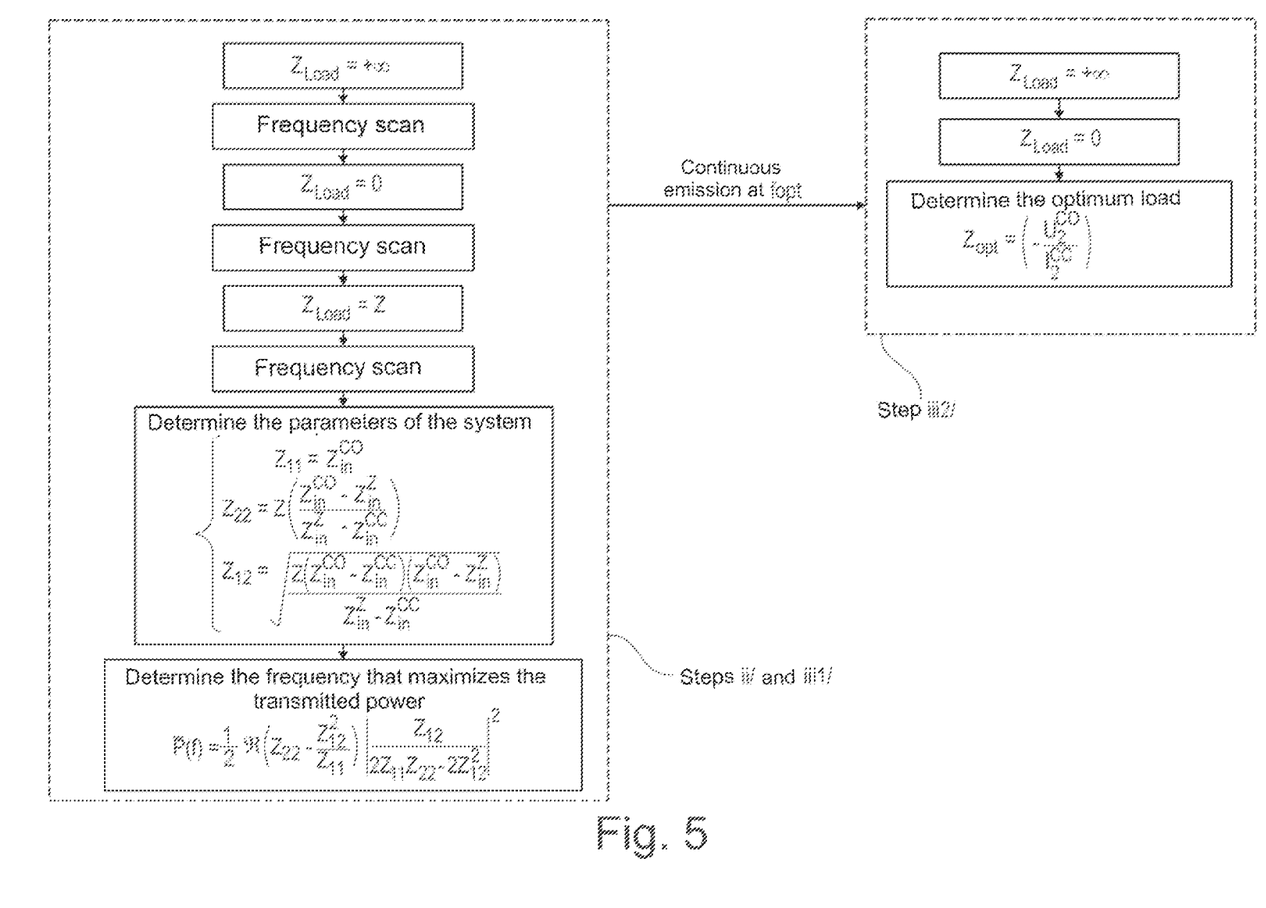
FIG. 5 is a block diagram of the sequences of the essential steps of the operating method according to the invention.

Steps ii/ and iii/ that have just been described for determining the frequency and the load to be connected in order to maximize the power transmitted to the receiver 3 are summarized in FIG. 5.

Figure 6:
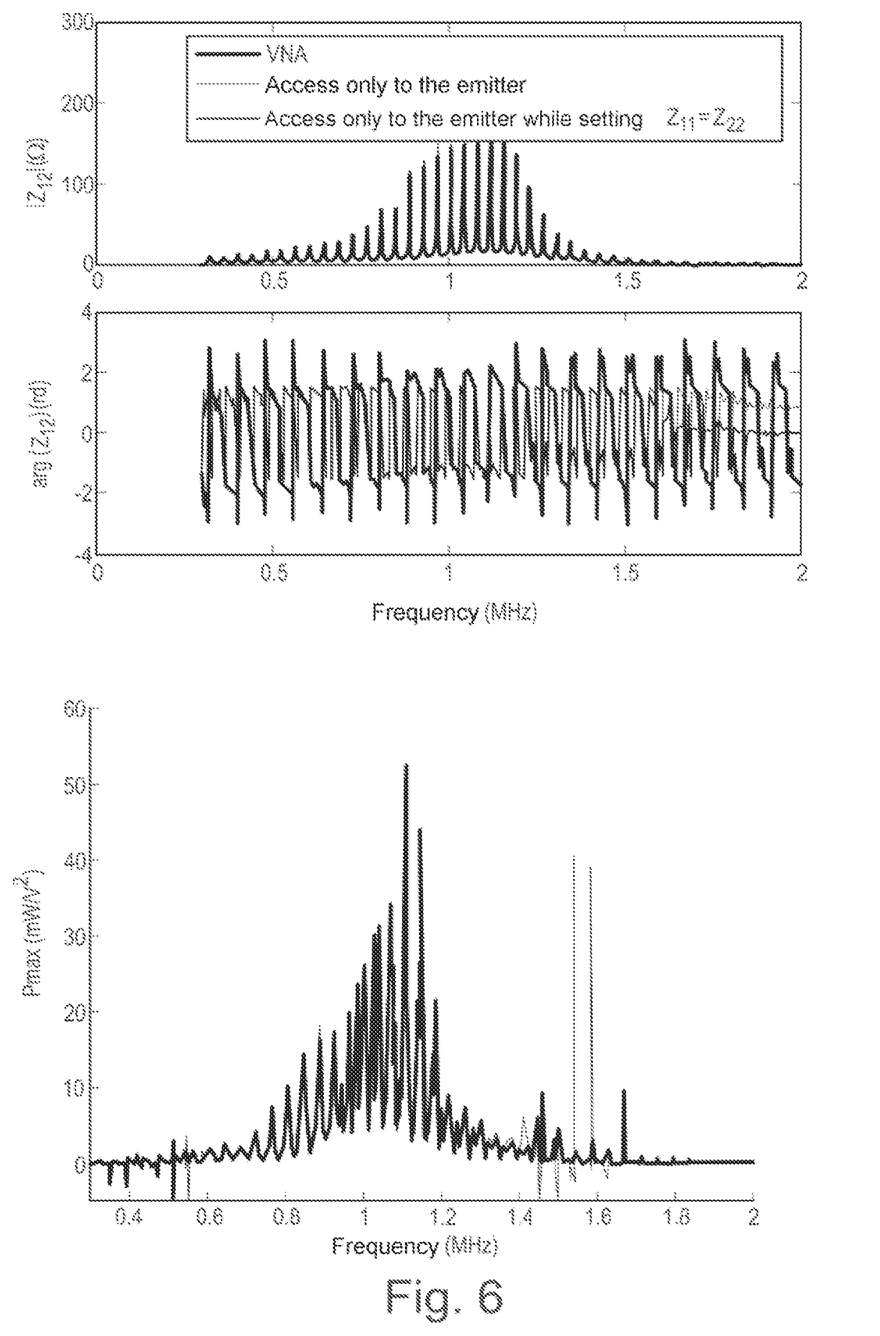
FIG. 6 illustrates, in the form of spectra, the impedance matrix and power transmitted from the emitter of an acoustic transmission system, by applying the sequences of the step of determining the electrical load of the method according to the invention.

Steps ii/ and iii1/ were validated experimentally with a system 1 on a 60 mm-thick aluminum wall.

The obtained spectra, as shown in FIG. 6, indicate that the method according to the invention does make it possible to obtain the best operating frequency that maximizes the transmitted power.

As already mentioned, in the frequency scans performed during steps ii/ and iii1/, it is necessary to change the electrical load connected to the receiver three times. Each change of electrical load has to be made after the end of the current frequency scan, and before the start of the following scan, in order to avoid interfering greatly with the measurement.

The duration needed for the change may be defined in line with the following three alternatives, which may be combined:

a/ Wait for a predefined duration: by defining a waiting duration, known beforehand to the emitter and the receiver. The receiver thus waits for this waiting duration that is known to the emitter after the end of the first frequency scan, before changing the connected electrical load;

b/ Wait for information from the receiver: the receiver indicates to the emitter, through an alternation of the connected load, that it is ready for the rest of the measurements and will change the connected load. This variation at the receiver is visible at the emitter and is sometimes used as a communication method: [4].

c/ Observe the input impedance and, based on this measurement, detect a change in output impedance: when the system is symmetrical (symmetrical wall and identical emitter and receiver), $Z_{11}=Z_{22}$. With this constraint, only two electrical loads are needed to characterize the system. These two loads may be applied passively to the receiver using a diode bridge and a capacitor connected to the receiver. In a first scan, the capacitor is discharged and imposes a zero voltage, and the behavior at input of the diode bridge is therefore equivalent to a closed circuit. By performing multiple frequency scans, the voltage across the terminals of the capacitor will increase, this being reflected in diode conducting and non-conducting phases. This non-linear behavior will be able to be analyzed at the emitter via a variation in the input impedance. The emitter may then reduce the excitation voltage level so that the voltage on the diode bridge is always lower than the voltage of the capacitor. The diodes are therefore in the blocking state 100% of the time and the impedance connected to the receiver is an open circuit. It is then possible to characterize the system without changing anything at the receiver.

Figure 7:
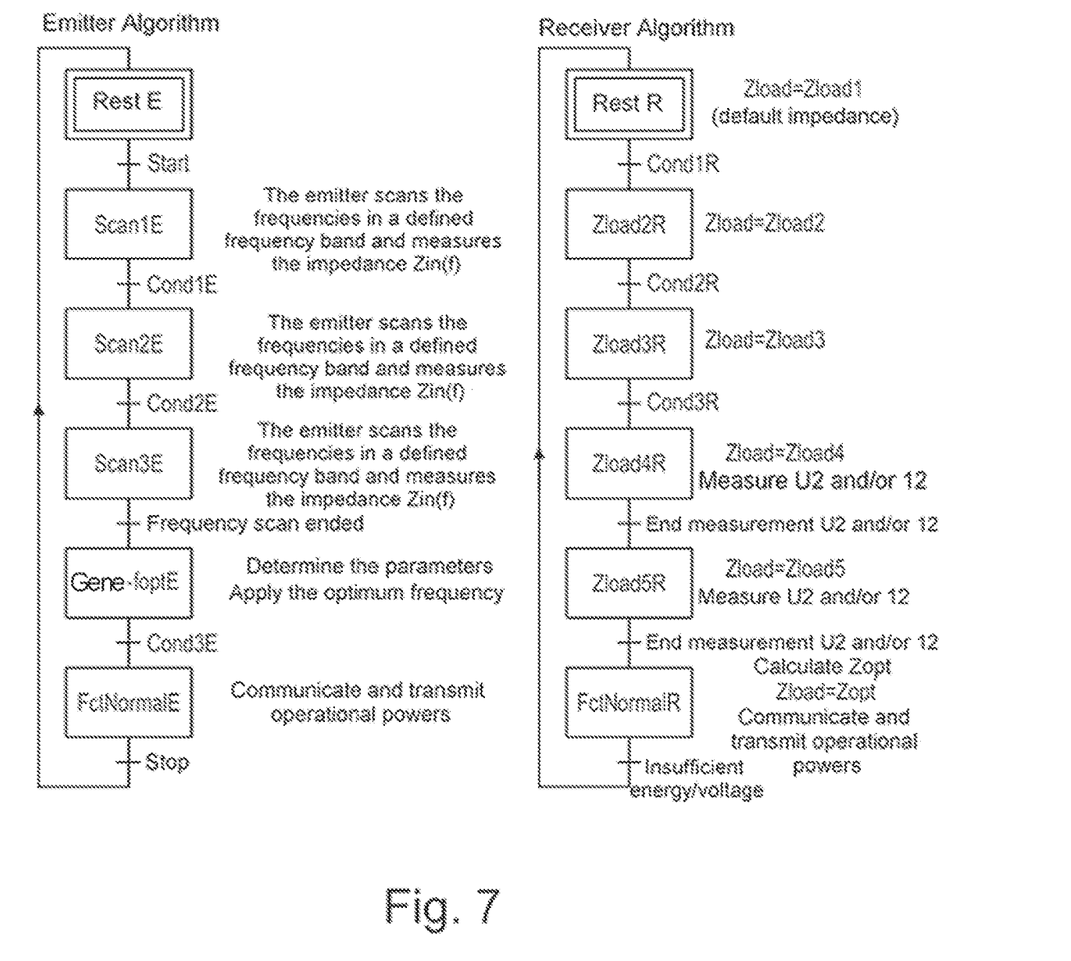
FIG. 7 is a block diagram of the sequences of the essential steps of the operating method according to the invention, in the form of a grafcet, as may be implemented by a computer program within the control unit of an acoustic transmission system.

FIG. 7 shows the sequences of the various steps that have just been described at the emitter and the receiver in the form of a GRAFCET algorithm.

In this FIG. 7, the conditions for changing from one sequence to another are as follows:

Cond1E: by choice or in combination:
    a/ Wait for a predefined duration,
    b/ Wait for information from the receiver (for example: load modulation),
    c/ Observe the input impedance and, based on this measurement, detect a change in output impedance.

Cond2E: by choice or in combination:
    a/ Wait for a predefined duration.
    b/ Wait for information from the receiver (for example: load modulation),
    c/ Observe the input impedance and, based on this measurement, detect a change in output impedance.

Cond3E: by choice or in combination:
    a/ Wait for a predefined duration,
    b/ Wait for information from the receiver (for example: load modulation, or communication on another frequency band).

Cond1R: by choice or in combination:
    a/ Wait for a predefined duration,
    b1/ Wait for a certain voltage/energy level.
    c1/ Wait for a certain received frequency.

Cond2R: by choice or in combination:
    a/ Wait for a predefined duration,
    b1/ Wait for a certain voltage/energy level,
    c1/ Wait for a certain received frequency.

Cond3R: by choice or in combination:
    a/ Wait for a predefined duration,
    b1/ Wait for a certain voltage/energy level,
    c1/ Wait for a certain received frequency.

Other advantages and improvements may be provided without, however, departing from the scope of the invention.

In the example described, in order to determine the parameters of the quadrupole ($Z_{11}$, $Z_{12}$ and $Z_{22}$) and of the optimum electrical load at the receiver ($Z_{opt}$), the method according to the invention consists in choosing, as distinct loads, an infinite load (open circuit), a zero load (short circuit) and any load other than infinity and zero. However, the method may be implemented regardless of the connected electrical loads, provided that they are distinct.

Moreover, the method described above relates to determining the frequency for maximizing the transmitted power. However, depending on requirements, it is entirely possible to choose the frequency that maximizes the voltage at the receiver U2 or the efficiency of the system. Indeed, knowing $Z_{11}$, $Z_{12}$, and $Z_{22}$ for each frequency makes it possible to predict the behavior of an acoustic transmission system and therefore to make it work with a parameter that is optimized depending on the desired application.

The method described above is described with reference to an acoustic transmission through a metal wall. The invention may also apply to a support made of another material whose characteristic acoustic impedance is typically between 1 and 100 MRayl. This may be for example a material chosen from steels, aluminum and other metals, concrete, bitumen, wood, rigid plastics, porcelain, glass, etc.

Moreover, the method described above is described with reference to an emitter and a receiver arranged on either side of the same metal wall. It also applies to an emitter and a receiver on the same side of the wall, and more generally on the same support.

The method according to the invention may also apply to air-based inductive systems or inductive systems with magnetic circuits, as long as the system remains linear, that is to say with small signals (far from the saturation of the magnetic materials).

However, the method according to the invention is more suited to the transmission of acoustic power, for which the optimum operating frequencies are difficult to predict, difficult to reproduce and depend greatly on external variables such as temperature.

The optimum operating frequencies are difficult to predict as the operation is highly dependent on the transmission medium. In RF, the propagation medium is generally air, or else an intermediate controlled/designed by the designer of the system, and there are not as many randoms and impacts of the propagation medium.

The invention is not limited to the examples that have just been described; features of the illustrated examples may in particular be combined with one another within variants that are not illustrated.

LIST OF CITED REFERENCES

1: T. J. Lawry et al., "*Electrical optimization of power delivery through thick steel barriers using piezoelectric transducers*", in Energy Harvesting and Storage: Materials, Devices, and Applications, April 2010, vol. 7683, p. 768314, doi: 10.1117/12.852563.
2: O. Freychet, F. Frassati, S. Boisseau, N. Garraud, P. Gasnier, and G. Despesse, "*Analytical optimization of piezoelectric acoustic power transfer systems*", Eng. Res. Express, vol. 2, no. 4, p. 045022, November 2020, doi: 10.1088/2631-8695/abcb4a.
3: O. Freychet et al., "*Efficient optimal load and maximum output power determination for linear vibration energy harvesters with a two-measurement characterization method*", Smart Mater. Struct., vol. 29, no. 1, p. 015003, November 2019, doi: 10.1088/1361-665X/ab516f.
4: G. J. Saulnier et al., "*P1G-4 Through-Wall Communication of Low-Rate Digital Data Using Ultrasound*", in 2006 IEEE Ultrasonics Symposium, October 2006, p. 1385-1389, doi: 10.1109/ULTSYM.2006.358.

The invention claimed is:

1. A method for operating an acoustic transmission system, comprising the following steps:
i/ installing the system with at least one emitter and at least one acoustic receiver on a support, the system being an electric quadrupole whose impedance matrix, linking the emitter voltage ($U_1$) and the receiver voltage ($U_2$) to the emitter current ($I_1$) and the receiver current ($I_2$), is written using the equation:

$$\begin{pmatrix} U_1 \\ U_2 \end{pmatrix} = \begin{pmatrix} Z_{11}(f) & Z_{12}(f) \\ Z_{21}(f) & Z_{22}(f) \end{pmatrix} \begin{pmatrix} I_1 \\ I_2 \end{pmatrix} \quad \text{[Equation 1]}$$

the quadrupole being reciprocal, with $Z_{12}$ being equal to $Z_{21}$;
ii/ performing frequency scanning three times in a row, each time with an electrical load connected to the receiver $Z_{load}$ distinct from the previous one, so as to determine the values of $Z_{11}$, $Z_{12}$ and $Z_{22}$ for each frequency;
iii/ based on the determination of the values of $Z_{11}$, $Z_{12}$ and $Z_{22}$, determining a characteristic frequency ($f_{opt}$) so as to maximize the transmitted power, the receiver voltage ($U_2$) or the efficiency of the system.

2. The method as claimed in claim 1, wherein the support is a wall with the emitter and the receiver being arranged on the same side or on either side of the wall.

3. The method as claimed in claim 1, wherein the distinct electrical loads connected to the receiver in step ii/ is respectively an infinite load, corresponding to an open electrical circuit at the receiver, a load of known value, and a zero load, corresponding to a short circuit at the receiver.

4. The method as claimed in claim 1, wherein the duration between each frequency scan is defined by the receiver, which waits for a predefined duration that is known to the emitter.

5. The method as claimed in claim 1, wherein the duration between each frequency scan is defined by the receiver, which indicates to the emitter that it is ready by alternating the connected load, and then changes the connected electrical load.

6. The method as claimed in claim 1, wherein the duration between each frequency scan is defined by a change in impedance at the emitter without active components at the receiver.

7. The method as claimed in claim 1, wherein step iii/ comprises the following sub-steps:
iii1/ determining the characteristic frequency (fopt) based on the determination of the maximum power achievable at each frequency (f) using the relationship $$\overline{P}(f) = \frac{1}{2} \Re \left( Z_{22} - \frac{Z_{12}^2}{Z_{11}} \right) \left| \frac{Z_{12}}{2Z_{11}Z_{22} - 2Z_{12}^2} \right|^2 \quad \text{[Equation 9]}$$

iii2/ applying two electrical loads connected to the receiver Zload that are distinct from one another, when a sinusoidal signal is emitted by the emitter, so as to determine the optimum electrical load based on Thévenin's theorem and the relationship $Z_{Load}=Z_{out}*$, determining the characteristic frequency and the optimum electrical load for maximizing the transmitted power.

8. The method as claimed in claim 7, wherein step iii2/ comprises keeping the voltage U1 at the emitter at a constant frequency and applying one of the two distinct electrical loads without the emitter disconnecting the signal.

9. The method as claimed in claim 7, wherein step iii2/ comprises measuring the amplitude of the signal of the voltage U2 or of the current I2 at the receiver during the connection of the first electrical load.

10. The method as claimed in claim 7, wherein step iii2/ comprises, before disconnecting the first electrical load, repeating a phase element as though the sinusoidal signal were continued.

11. The method as claimed in claim 7, wherein step iii2/ comprises applying the second electrical load.

12. The method as claimed in claim 7, wherein step iii2/ comprises measuring the amplitude of U2 or I2 and the phase with the continued signal before disconnecting the first load.

13. The application of the method as claimed in claim 1 in order to send electric power through a metal wall.

14. The application according to claim 13, wherein the wall is a metal wall of a vessel, a submarine, a tank, a container or a pipe.

\* \* \* \* \*